(12) United States Patent
Jones et al.

(10) Patent No.: US 6,558,554 B1
(45) Date of Patent: May 6, 2003

(54) METHOD FOR SWITCHING FILTERS ON-LINE WITHOUT BUBBLES AND WITH ZERO LIQUID WASTE

(75) Inventors: Angela H. R. Jones, Rochester, NY (US); Steven D. Possanza, Penfield, NY (US); Brian J. Connolly, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/021,599

(22) Filed: Dec. 12, 2001

(51) Int. Cl.$^7$ .................................................. C02F 1/00
(52) U.S. Cl. ........................ 210/739; 210/744; 210/103; 210/104; 210/418; 210/420; 210/143; 210/248; 210/340
(58) Field of Search .................. 210/739, 741, 210/767, 805, 744, 98, 99, 100, 103, 104, 143, 194, 248, 340, 341, 418, 420, 424

(56) References Cited

U.S. PATENT DOCUMENTS

| | | |
|---|---|---|
| 3,672,507 A | 6/1972 | Paull, Jr. |
| 3,902,875 A | 9/1975 | Bridigum et al. |
| 3,923,479 A | 12/1975 | Glass et al. |
| 3,979,292 A | 9/1976 | Kuhn |
| 4,033,870 A | 7/1977 | Parquet et al. |
| 4,370,232 A | 1/1983 | Busse et al. |
| 4,615,800 A | 10/1986 | Stifelman et al. |
| 4,752,386 A | 6/1988 | Schulz et al. |
| 4,786,409 A | 11/1988 | Miller |
| 6,056,431 A | 5/2000 | Owen et al. |
| 6,084,187 A | 7/2000 | Buecker et al. |

Primary Examiner—Robert J. Popovics
(74) Attorney, Agent, or Firm—Mark G. Bocchetti

(57) ABSTRACT

A method for switching filters on-line while continuously supplying a fluid to a downstream operation such as a photographic product coating device comprising transmitting the fluid to a filter selection valve having a first flow path therethrough to a first filter and a second flow path therethrough to a second filter; flowing the fluid through the first flow path and through the first filter to a filter diverter valve having a first fluid from the first filter to the downstream operation, a second fluid path from the second filter to the downstream operation, a third fluid path from the first filter to a drain, and a fourth fluid path from the second filter to the drain; directing the fluid through the first fluid path; determining when the first filter will soon become inoperable; opening the second flow path through the filter selection valve and opening the fourth fluid path through the filter diverter valve; closing the fourth fluid path after the fluid has flowed through the second filter but prior to any of the fluid exiting the fourth fluid path to drain; opening the second fluid path through the filter diverter valve and concurrently flowing the fluid through the first and second filters to the downstream operation; and closing the first flow path through the filter selection valve and the first fluid path through the filter diverter valve such that all flow of the fluid to the downstream operation is through the second filter.

9 Claims, 1 Drawing Sheet

US 6,558,554 B1

METHOD FOR SWITCHING FILTERS ON-LINE WITHOUT BUBBLES AND WITH ZERO LIQUID WASTE

FIELD OF THE INVENTION

The invention relates generally to the field of liquid filtering systems, and, more particularly to filtering systems that allow for on-line switching between discrete filters such that overall process flow is uninterrupted.

BACKGROUND OF THE INVENTION

In the manufacture of photographic products, such as photographic films and papers, support webs are coated with one or more layers in a continuous operation. A variety of coating apparatus may be used including, for example, curtain-coating apparatus, bead coating apparatus, and extrusion coating apparatus. All of these coating methods require a constant source of clean coating solution. Traditionally, after the coating solution or composition is prepared, it is filtered as it is delivered to the coating process. If a single filter is used, the filter path becomes blocked as a result of the filtering action. In other words, as the filter collects contaminating particulates from the coating solution, the greater the back pressure caused by the filtration operation. At some point, the filter becomes so blocked that flow of coating solution to the coating machine must be stopped to allow the filter to be removed and either changed or cleaned. Therefore, it is typical for such coating operations to now employ two or more filters arranged in parallel, thereby allowing switching from a first (plugged) filter to a second (clean) filter on-line without interruption of coating solution flow through the process. In this filter switching operation, it is typical that the second filter be prepared by flowing a coating solution there through to drain while the first (plugged) filter continues to filter solution supplied to the coating machine. Without preparation of the second filter, air bubbles would be delivered to the coating machine resulting in severe coating defects in the coating product. When the second filter is fully prepared, as determined through the detection of coating solution at the drain, the second filter is brought on-line and flow through the first (plugged) filter is terminated. The plugged filter is then replaced. In that manner, the first filter stands ready to filter coating solution when the second filter becomes plugged.

Although the prior art filtering method discussed above allows for uninterrupted flow of coating solution to the coating machine, switching from one filter to another arranged in parallel has the drawback of requiring that coating solution be flowed to drain during filter preparation and thereby wasted.

SUMMARY OF THE INVENTION

It is therefore an object of the present invention to provide a method for switching between filters arranged in parallel that substantially eliminates waste of coating solution.

It is a further object of the present invention to provide a method for switching between filters in a coating operation that eliminates waste of coating solution from filter preparation while still preventing introduction of bubbles to the coating machine.

Briefly stated, these and numerous other features, objects and advantages of the present invention will become readily apparent upon a reading of the detailed description, claims and drawings set forth herein. These features, objects and advantages are accomplished by employing a multiport filter selection valve upstream of the parallel filters in the process, a multiport filter diverter valve downstream of the parallel filters in the process, and a flow surge device downstream of the filter diverter valve but upstream of the coating machine. With this hardware, when it is determined the first filter will soon become inoperable, a concurrent flow path through the filter selection valve is opened such that coating solution is simultaneously flowed through both the first and second filters. A concurrent flow path through the filter diverter valve is opened such that while coating solution flowing through the first filter is still being supplied to the coating machine, the flow path for coating solution flowing through the second filter is to drain. Once the flow path to drain through the second filter is opened, however, the port open to drain in the filter diverter valve remains open for a fixed period of time. That fixed period may be predetermined by calculation, knowing the volume of the second filter and the associated conduit path through the filter selection valve and the filter diverter valve as well as the flow rate of the solution therethrough. In this manner, the process computer or programmable logic controller (PLC) controlling actuation of the filter selection valve and the filter diverter valve can time the closing of the port open to drain in the filter diverter valve such that substantially all of the air in such flow path has been driven therefrom without actually sending any coating solution to drain. The port in the filter diverter valve to the downstream process is simultaneously opened. At this point, coating solution is flowing through both filters to the surge device downstream thereof. Then the appropriate ports in the filter selection valve and the filter diverter valve are closed such that the process flow path is no longer though the first filter and all flow of coating solution to the surge device is through the second filter. With the first filter now out of service, an operator can replace the spent filter with a new or cleaned filter thereby readying it for a reverse switching operation when the second filter becomes plugged.

The determination of the period of time that the flow path through a new filter is open to drain will vary depending not only on the flow rate and the volume of the filter, but the type of filter media as well. The process computer or PLC may be preprogrammed with the critical information for a variety of filters, filter sizes and filter media. The flow rate may be predetermined and input into the process computer or PLC, or alternatively, the flow rate may be measured with well-known flow measurement devices transmitting such information to the process computer or PLC.

BRIEF DESCRIPTION OF THE DRAWINGS

The FIGURE is a schematic showing the two filters arranged in parallel in combination with a filter selection valve, a filter diverter valve and a surge device allowing practice of the method of the present invention.

DETAILED DESCRIPTION OF THE INVENTION

Figure 1:
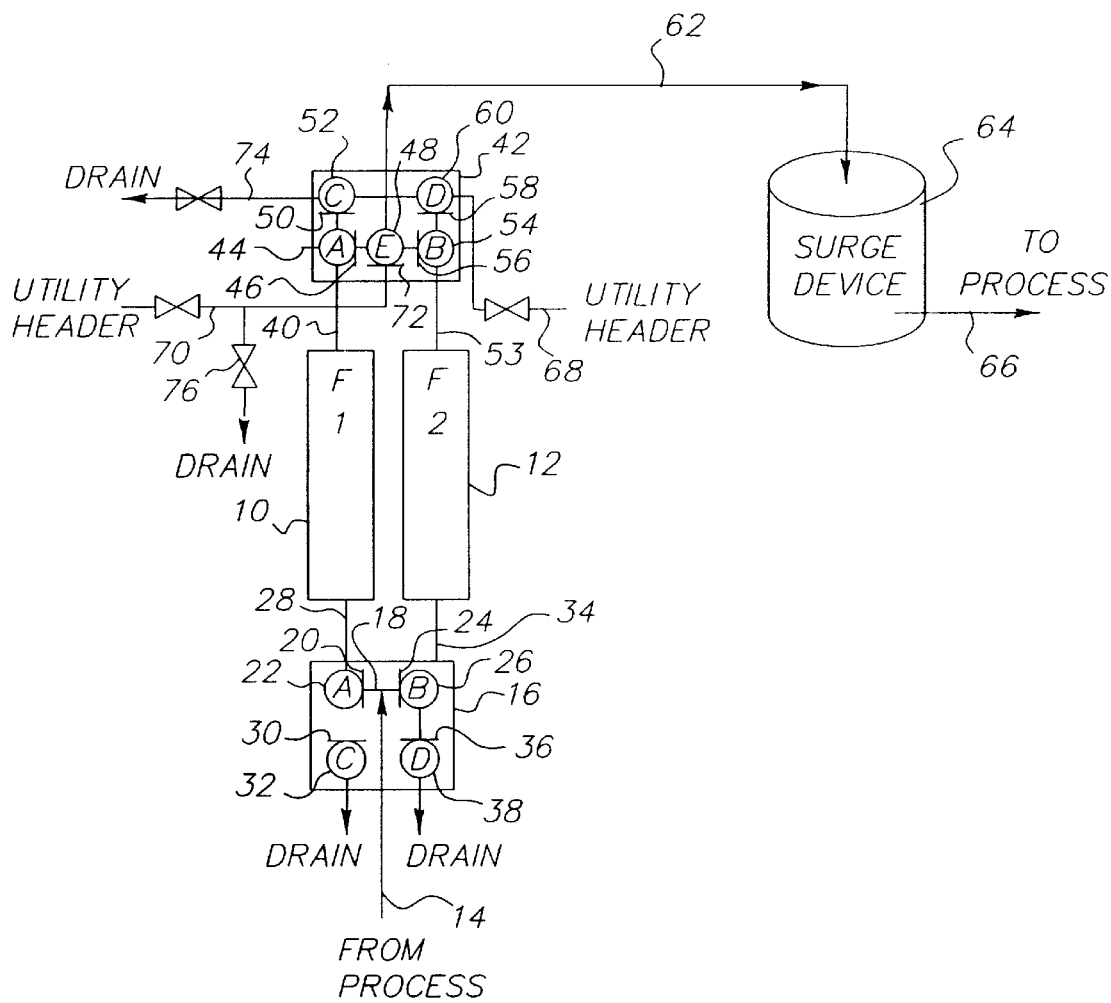

Turning to the FIGURE there is schematically depicted a first filter valve 10 and a second filter valve 12 arranged in parallel to receive coating liquid from a source through a supply conduit 14. The supply conduit 14 is connected to a filter selection valve 16 such that the solution is transmitted to an internal tee 18 in filter selection valve 16. From tee 18 coating solution can be transmitted through port 20 in valve chamber 22 and/or through port 24 in valve chamber 26. Fluid entering valve chamber 22 can be transmitted through conduit 28 to first filter 10 or through port 30 in valve chamber 32 to drain. Fluid entering valve chamber 26 can be transmitted through conduit 34 to second filter 12 or through port 36 in valve chamber 38 to drain.

Fluid exiting filter 10 is transmitted via conduit 40 to filter diverter valve 42 to enter valve chamber 44. Fluid entering valve chamber 44 can then either be transmitted through port 46 into valve chamber 48 or through port 50 into valve chamber 52. Fluid exiting filter 12 is transmitted via conduit 53 to filter diverter valve 42 to enter valve chamber 54. Fluid entering valve chamber 54 can then either be transmitted through port 56 into valve chamber 48 or through port 58 into valve chamber 60. Fluid entering valve chamber 48 is transmitted from filter diverter valve 42 through conduit 62 to surge device 64. The surge device 64 may be merely a tank to provide volume to prevent flow upsets, or it may be a bubble elimination tube or tank as is well known to those skilled in the art. The volume in surge device 64 will typically be level controlled. A variety of level sensors may used to institute level control of the surge device 64 with a variety of control schemes that are well known to those skilled in the art to maintain level when coating solution is drawn therefrom and delivered via conduit 66 to the downstream process that includes the coating apparatus.

There may be a utility conduit 68 for delivering flush water to valve chamber 60 of filter diverter valve 42. Similarly, there may be a utility conduit 70 for delivering flush water through port 72 to valve chamber 48 of filter diverter valve 42. Filter diverter valve 42 may also have a drain line 74 exiting from valve chamber 52 thereof, and utility conduit 70 may also be equipped with a drain connection 76.

In order to describe the sequence of the method of the present invention, it will be assumed that all process flow of liquid through filter selection valve 16 is initially being directed through first filter 10. In such case, ports 20 and 46 are open and all other ports in both the filter selection valve 16 and the filter diverter valve 42 are closed.

When it is determined the first filter 10 will soon become inoperable, a concurrent flow path through the filter selection valve 16 is opened such that coating solution is simultaneously flowed through both the first filter 10 and the second filter 12. This is accomplished by opening ports 24 and 58 in filter selection valve 16 and filter diverter valve 42, respectively. This concurrent flow path through the filter diverter valve 42 is opened such that while coating solution flowing through the first filter 10 is still being supplied to the downstream process, the flow path for coating solution flowing through the second filter 12 is directed to drain via valve chamber 52 and conduit 74. Once the flow path to drain through the second filter 12 is opened, however, the port 58 in the filter diverter valve 42 remains open for a fixed period of time. That fixed period may be predetermined by calculation, knowing the volume of the second filter 12 and the associated conduit path through the filter selection valve 16 and the filter diverter valve 42 as well as the flow rate of the solution therethrough. In this manner, the process computer or programmable logic controller (not shown) controlling actuation of filter selection valve 16 and filter diverter valve 42 can time the closing of port 58 such that substantially all of the air in that portion of the flow path has been driven therefrom without actually sending any coating solution to drain. Port 56 in the filter diverter valve 42 is simultaneously opened with the closing of port 58. At this point, coating solution is flowing through both filters 10, 12 to the surge device 64 downstream thereof. Then ports 20 and 46 in the filter selection valve and the filter diverter valve, respectively, are closed such that the process flow path is no longer through the first filter 10 and all flow of coating solution to the surge device 64 is through the second filter 12. With the first filter 10 now out of service, an operator can replace the spent filter with a new or cleaned filter thereby readying it for a reverse switching operation when the second filter 12 becomes plugged.

As discussed above, one of the steps of the method of the present invention is to open the flow path to drain through the second filter 12 to drain. This is done by opening port 58 in the filter diverter valve 42. During this step if the volume in surge device 64 drops below an acceptable level (as determined by a level sensor/controller [not shown]), such step can be paused by closing port 58 in the filter diverter valve 42 to force all coating solution through the plugged first filter 10 to the surge device 64. Once the level in the surge device 64 has recovered, port 58 can be reopened to complete the remaining time of the fixed period of time that port 58 is supposed to remain open, thereby completing the air purge of second filter 12.

Although the fluid or coating solution initially exiting the second filter 12 after a filter switch may not be completely bubble-free, the amount of air remaining in the second filter 12 will have been dramatically reduced. Such reduced air volume can easily be removed from the fluid prior to the coating machine with well known bubble elimination devices such as may be used for surge device 64.

The method of the present invention allows the filters to be switched on-line without initially sending coating solution to drain and without introduction of bubbles or flow perturbation to the coating apparatus downstream of the filters. Thus, replacing the plugged filters can occur while continuously supplying the coating machine with coating solution.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST

10 first filter
12 second filter
14 supply conduit
16 filter selection valve
18 internal tee
20 port
22 valve chamber
24 port
26 valve chamber
28 conduit
30 port
32 valve chamber
34 conduit
36 port
38 valve chamber
40 conduit
42 filter diverter valve 44 valve chamber
46 port
48 valve chamber
50 port
52 valve chamber
53 conduit
54 valve chamber
56 port
58 port
60 valve chamber
62 conduit
64 surge device
66 conduit
68 utility conduit
70 utility conduit
72 port
74 drain line
76 drain connector

What is claimed is:

1. A method of switching filters on-line while continuously supplying a fluid to a downstream operation comprising the steps of:

(a) transmitting the fluid to a filter selection valve having a first flow path therethrough to a first filter and a second flow path therethrough to a second filter;

(b) flowing the fluid through the first flow path and through the first filter to a filter diverter valve having a first fluid path from the first filter to the downstream operation, a second fluid path from the second filter to the downstream operation, a third fluid path from the first filter to a drain, and a fourth fluid path from the second filter to the drain;

(c) directing the fluid through the first fluid path;

(d) determining when the first filter will become inoperable due to plugging;

(e) opening the second flow path through the filter selection valve and opening the fourth fluid path through the filter diverter valve;

(f) closing the fourth fluid path after the fluid has flowed through the second filter but prior to any of the fluid exiting the fourth fluid path to drain;

(g) opening the second fluid path through the filter diverter valve and concurrently flowing the fluid through the first and second filters to the downstream operation; and (h) closing the first flow path through the filter selection valve and the first fluid path through the filter diverter valve such that all flow of the fluid to the downstream operation is through the second filter.

2. A method as recited in claim 1 further comprising the step of:

(i) replacing a filter media in the first filter.

3. A method as recited in claim 2 further comprising the step of:

draining the first filter prior to replacing the filter media therein.

4. A method as recited in claim 3 wherein:

the draining step is performed through a first drain path in the filter selection valve.

5. A method as recited in claim 1 further comprising the step of:

flowing the fluid from the filter diverter valve through a surge device located before the downstream operation.

6. A method as recited in claim 5 wherein:

the surge device is a bubble elimination device.

7. A method as recited in claim 5 further comprising the step of:

operating the surge device by level control.

8. A method as recited in claim 2 further comprising the steps of:

(j) opening the first flow path through the filter selection valve and opening the third fluid path through the filter diverter valve;

(k) closing the third fluid path after the fluid has flowed through the first filter but prior to any of the fluid exiting the third fluid path to drain;

(l) opening the first fluid path through the filter diverter valve and concurrently flowing the fluid through the first and second filters to the downstream operation; and (m) closing the second flow path through the filter selection valve and the second fluid path through the filter diverter valve such that all flow of the fluid to the downstream operation is through the first filter.

9. A method as recited in claim 1 further comprising the step of:

flowing the fluid through a bubble elimination device downstream of the fluid diverter valve.

* * * * *